United States Patent Office 3,175,989
Patented Mar. 30, 1965

3,175,989
METHYL METHACRYLATE POLYMERS MODIFIED WITH PHTHALIC ACID ESTERS
Joseph A. Cannon, Affton, and Joseph R. Darby, Webster Groves, Mo., assignors to Monsanto Company, a corporation of Delaware
No Drawing. Filed May 4, 1960, Ser. No. 26,695
14 Claims. (Cl. 260—31.8)

This invention relates to improved coating compositions. More specifically it relates to improved coating compositions or lacquers which contain as an essential film-forming constituent an acrylic resin.

Acrylic resins, i.e. resins formed from polymers of methyl methacrylate, are being used for surface coatings in constantly-increasing amounts because of their durability, ease of application, lack of odor and speed of drying. Thus, acrylic resins are used to provide emulsion paints, masonry coatings and automotive finishes. A thermosetting acrylic-base coating is used for appliances. Generally, acrylic resins provide hard, brittle coatings which are susceptible to cracking under impact and which often lack desired adhesive qualities. Also, the usual acrylic resin coating is quite vulnerable to attack from aromatic hydrocarbons, chlorinated hydrocarbons and esters.

For most surface coating operations, whether by brushing or spraying, acrylic resins dissolved in organic solvents are used. By changing the resin, various qualities of the coating such as hardness and durability, can be altered. Another method of modifying the qualities of an acrylic resin coating is to incorporate a plasticizer for the resin into the resin solution prior to coating a surface. By so doing, the hardness of the ultimate coating can be reduced, the tendency to peel can be reduced, or increased solvent resistance can be provided. Most commercial plasticizers today do not improve all of these desirable properties in the ultimate coating, but only affect some of these properties.

Another difficulty which arises in the utilization of acrylic coating compositions is the problem of crazing. Crazing is characterized by the occurrence of minute shallow cracks at the surface of the dry coating when it is exposed to a liquid solvent, e.g., when it is patched or recoated with the same or a similar lacquer at normal painting temperatures (50°–90° F.). The resulting coating is unacceptable because of its apparent low gloss, roughness and non-uniform appearance.

The incorporation of a plasticizer in acrylic lacquers reduces crazing and with some plasticizers enough can be added to completely eliminate crazing. When enough plasticizer has been added to prevent crazing, the coatings are too thermoplastic in comparison with conventional lacquers and enamels to be used for normal purposes, and they are less durable in outdoor service than similar products containing less plasticizer. Moreover, the plasticizers which have been found to be for this purpose, are in general, extremely volatile and thus the lacquer film derived from coating compositions containing such materials are subject to cracking and lose their desirable gloss characteristics.

Therefore, it is a principal object of this invention to provide improved acrylic coating compositions or lacquers. A further object is to provide acrylic coating compositions or lacquers which yield on drying a durable, adherent, craze resistant coating.

Other objects will be apparent from the following description of the invention.

These objects are accomplished by providing a liquid coating composition comprising an acrylic resin, a solvent therefor and a compatible amount of a compound of the structure

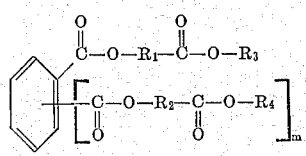

wherein $m$ is an integer of from 1 to 4, $R_1$ and $R_2$ are divalent aliphatic hydrocarbon radicals containing from 1 to 4 carbon atoms and $R_3$ is an aliphatic, cycloaliphatic or araliphatic radical having up to 18 carbon atoms and $R_4$ is an eliphatic or cycloaliphatic radical having up to 18 carbon atoms.

The $R_1$ and $R_2$ radicals in the above structure can be like or unlike alkylene radicals having one to four carbon atoms in a straight chain, e.g. methylene, propylene, isopropylene, n-butylene, isobutylene, 2-methylbutylene, etc.

The $R_3$ and $R_4$ radicals can be derived from many sources. For example, the aliphatic radicals can be straight or branched chain radicals having up to 18 carbon atoms derived from various sources such as alcohols, including alcohols produced by the oxo synthesis or alcohols obtained by catalytic dehydrogenation of coconut oil, from oxidized waxes or from esterification of a carbonyl group by reaction with an olefin. Illustrative examples of aliphatic radicals are: methyl, ethyl, propyl, isopropyl, n-butyl, isobutyl, sec-butyl, tert.-butyl, n-amyl, isoamyl, n-hexyl, isohexyl, 2-ethylheptyl, 2-ethylhexyl, octyl, isooctyl, 2-octyl, isononyl, decyl, lauryl, tetradecyl, pentadecyl, octadecyl, allyl, crotyl, oleyl, alkyl radicals derived from $C_3$ to $C_{20}$ oxo alcohols etc. Illustrative examples of cycloaliphatic radicals are: cyclobutyl, cyclopentyl, 2-methylcyclopentyl, 3-methylcyclopentyl, 2,4-dimethylcyclopentyl, cyclohexyl, 3,5-dimethylcyclohexyl, gem.-dimethylcyclohexyl, cyclohexylmethyl, cyclohexylpropyl, methylcyclohexylethyl, 2-propylcyclohexyl, 3-dodecylcyclohexyl, cycloheptyl, 2,4-dimethylcycloheptyl, 2,3,5-trimethylcycloheptyl, naphthenyl, hydroabietyl, etc. Illustrative examples of araliphatic radicals are: benzyl, 4-methylbenzyl, 3-caprylbenzyl, diisobutylbenzyl, phenylethyl, phenylpropyl, phenyldodecyl, etc.

A preferred group of esters are those of the following structure:

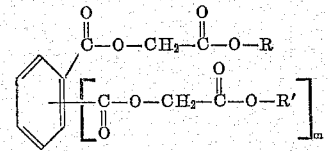

wherein R and R' are alkyl or cycloalkyl radicals containing from 6 to 18 carbon atoms and m is an integer of from one to three.

The aforedescribed esters may be prepared by methods well known to those skilled in the art, e.g. they may be prepared by reacting an aromatic acid, such as orthophthalic, isophthalic, terephthalic, trimellitic or pyromellitic acid with an ester of a hydroxycarboxylic acid, e.g. glycolic acid, β-hydroxypropionic, gamma-hydroxybutyric, etc.

A preferred method of preparing these esters involves the reaction of an aromatic acid with an aliphatic or cycloaliphatic ester of a lower haloalkanoic acid, e.g. chloroacetic, iodoacetic, 3-chloropropionic, bromoacetic, 4-chlorobutyric acid, etc., in the presence of a tertiary aliphatic amine.

The amount of the esters of this invention used to plasticize acrylic resins can vary considerably, depending upon such factors as the specific acrylic resin used and ultimate properties desired. Accordingly, the amount used is a plasticizing amount determinable by a consideration of many factors. Thus, for example, in the case of acrylic resin solutions, commonly known as lacquers, which basically are solvent solutions of the resin, from about 10 to 50 parts by weight of the compounds of this invention per 100 parts of resin are used. However, anywhere from about 5 parts to about 100 parts by weight per 100 parts of resin can be used.

The term "acrylic resin," as used herein, is meant to include polymers of methyl methacrylate, which can be either homopolymers of methyl methacrylate or copolymers with minor amounts, for example, up to 25% by weight, of another material copolymerizable therewith, for example, acrylic acid, methacrylic acid, the 1 to 4 carbon alkyl (i.e., methyl to butyl) esters of acrylic acid, the 2 to 4 carbon alkyl (i.e., ethyl, propyl and butyl) esters of methacrylic acid, vinyl acetate, acrylonitrile, various amides and styrene. A preferred copolymer contains about 98% of methyl methacrylate and 2% methacrylic acid. Thus the term "polymer of methyl methacrylate" and related terms, as used herein, refer to such homopolymers and copolymers as well as mixtures of homopolymers, mixtures of copolymers, and mixtures containing both homopolymer and copolymer.

Polymers of methyl methacrylate for use in this invention can be prepared according to well known methods by polymerizing methyl methacrylate monomer, with or without another monomer copolymerizable therewith, either in bulk, in solution, or in granular form to produce polymers having a wide range of molecular weights, e.g. from about 55,000 to 160,000. Polymers having molecular weight of about 55,000 to about 105,000 are readily soluble in a wide variety of comon and relatively inexpensive solvents and are preferred for the practice of this invention.

The coating compositions or lacquers, which terms are used herein synonymously to refer to liquid coating compositions suitable for application to a substrate, can contain conventional modifying agents in addition to the essential constituents of polymer of methyl methacrylate and solvent. Thus they can, and will unless a clear coating is desired, contain pigments, and they can also contain other conventional modifiers for coating compositions such as nitrocellulose, other well known plasticizers for polymers of methyl methacrylate, e.g. butyl benzyl phthalate, inhibitors, dispersing agents, flow control agents, baking catalysts, e.g. alkyl ammonium halides, and the like.

Examples of the volatile solvents and diluents which can be used in formulating the coating compositions of this invention are toluene, xylene, butyl acetate, acetone, methyl isobutyl ketone, butyl alcohol, and other aliphatic, cycloaliphatic and aromatic hydrocarbons, esters, ethers, ketones, and alcohols, such as are conventionally used in coating compositions.

Acrylic resin coating compositions provided by using the esters of this invention in conjunction with polymers of methyl methacrylate can be applied to a substrate by any conventional method, such as spraying, dipping or brushing to provide individual coatings of a thickness normally employed in the organic coating art, e.g. 0.2–2.0 mls. Although the coatings can be air dried, the drying period can be minimized by baking.

From the data provided herein, it is readily seen that the compounds of this invention are all superior to butyl benzyl phthalate as plasticizers for acrylic resins when considered in terms of volatility of the plasticizers. As is known to those skilled in the art, to be of any ultimate value a plasticizer should be relatively non-volatile in order to provide a plasticized composition which will retain its desired properties for fairly long durations of time. Additionally, many of the compounds of this invention are also superior to butyl benzyl phthalate with regard to humidity, stability and/or adhesion and therefore when considered in terms of such property are better suited for use in many applications.

The lacquers provided by utilizing the esters of this invention are most useful as coatings which are occasionally patched or refinished, which are not easily marred by imprints and which are durable in outdoor service. A specific example of an application where such properties are necessary is as a top coat finish for suitably primed automobile bodies.

In evaluating the plasticizing efficiency of the esters of this invention, use is made of the following empirical testing procedures:

*Humidity stability.*—Test solutions are cast on tin panels, dried, and the plates placed in an environment wherein conditions of a temperature of 100° C. and a relative humidity of 100% are maintained. After six (6) days the panels are removed and the surface of the panels is inspected and any effects upon the surface noted.

*Adhesion.*—The adhesiveness of an acrylic resin film to a surface is determined by making a V-shaped cut with a razor blade on a steel test panel, which has been primed with a medium soya oil alkyd and red lead composition, coated (3 mil knife) with the test solution and baked at 107° C. for 30 minutes. After 24 hours, masking tape is then placed over the V and then pulled off at an angle of 180 degrees.

*Volatility from films.*—The volatility of a plasticizer from a film of an acrylic coating is determined by coating a tin panel with the test solution, drying the coating, weighing the panel and then placing the panel in an oven maintained at 100° C. for twenty-four hours. Thereafter the panel is cooled and weighed, and any loss in weight is calculated as the percent of plasticizer lost.

The invention is further illustrated, but not limited by the following examples in which all parts and percentages are by weight unless otherwise indicated.

EXAMPLES 1 THROUGH 12

Compositions containing: Parts
Polymer of methyl methacrylate (M.W. 100,000) __ 80
Solvent (toluene) _____ 162
Plasticizer (see Table I) _____ 20

262 are prepared by mixing the tabulated ingredients in conventional paint mixing equipment until smooth dispersions are produced. The resulting composition is then ready for coating the various metal panels required in the particular testing procedure. In Table I which follows, the esters of this invention (Examples 2 through 12) are compared with a standard commercial acrylic resin plasticizer, butyl benzyl phthalate (Example 1).

*Table I*

| Example No. | Plasticizer | Humidity Stability Relative ratings [1] | Volatility Percent Plasticizer lost | Adhesion [2] |
|---|---|---|---|---|
| 1 | Butyl benzyl phthalate (Control) | 4 | 48.0 | B. |
| 2 | Bis(butoxycarbonylmethyl)phthalate. | 11 | 4.9 | B. |
| 3 | Bis(hexoxycarbonylmethyl)phthalate. | 10 | 2.6 | C. |
| 4 | Bis(2-ethylhexoxycarbonylmethyl)-phthalate. | 3 | 1.9 | B. |
| 5 | Bis(decyloxycarbonylmethyl)-phthalate. | 1 | 0.8 | C. |
| 6 | Bis(tridecyloxycarbonylmethyl)-phthalate. | 8 | 1.7 | B. |
| 7 | Tris(2-ethylhexoxycarbonylmethyl)-trimellitate. | 7 | 0.9 | B. |
| 8 | Tetra(2-ethylhexoxycarbonylmethyl)-pyromellitate. | 6 | 1.0 | B. |
| 9 | Bis[1-(butoxycarbonyl)ethyl] isophthalate. | 5 | 8.9 | B. |
| 10 | Bis(cyclohexoxycarbonylmethyl)-phthalate. | 9 | 0.2 | A. |
| 11 | Bis[3-(hexoxycarbonyl)propyl] phthalate. | 2 | 0.6 | C. |
| 12 | Bis(2-ethylhexoxycarbonylmethyl)ester of an isomeric mixture of phthalic acids (38.5 Mol percent orthophthalic, 23 Mol percent isophthalic and 38.5% Mol percent terephthalic). | 5 | 0.7 | B. |

[1] One is the rating assigned to the compound giving the most stable composition.
[2] A=peeling of less than 1/32 inch, B=peeling of 1/32 to 1/16 inch, C=peeling greater than 1/16 inch.

EXAMPLE 13

A methyl methacrylate topcoat lacquer having the following composition:

|  | Parts |
|---|---|
| Homopolymer of methyl methacrylate [1] (M.W.=55,000) | 19 |
| 98/2 copolymer of methyl methacrylate [1] and methacrylic acid (M.W.=75,000) | 5 |
| Titanium dioxide | 10 |
| Toluene | 36 |
| Acetone | 11 |
| Xylene | 8 |
| Bis(2-ethylhexoxycarbonylmethyl)phthalate | 11 |
|  | 100 |

[1] The homopolymer and copolymer of methyl methacrylate employed in this composition have relative viscosities of about 1.173 and 1.157 respectively.

is prepared by grinding the pigment in a solution of the copolymer until a smooth uniform dispersion is obtained and subsequently adding to the resulting dispersion a solution of the homopolymer.

A test panel is coated with a primer containing 55% linseed oil modified glyceryl phthalate alkyl resin (60 parts) and 50% linseed oil modified phenol-formaldehyde resin varnish (40 parts), baked for 30 minutes at 245° F., and then cooled to room temperature. The methyl methacrylate topcoat lacquer described above, which has been thinned to suitable spraying viscosity, is then sprayed over the whole area of the test panel in a sufficient amount to provide a dry layer of topcoat about 1.5 mils thick. The panel is baked for 20 minutes at 180° F., whereby a dry hard coating is produced.

The dry coated panel has acceptable properties with respect to appearance, gloss, hardness and adhesion.

Similar results are obtained when the bis(2-ethylhexoxycarbonylmethyl) phthalate for the foregoing example is replaced by an equal amount of each of the plasticizers of Examples 2, 3 and 5 through 12.

EXAMPLE 14

This example illustrates a lacquer which contains as a film former in addition to a methyl methacrylate/glycidyl methacrylate copolymer a methyl methacrylate/methacrylate copolymer. The solvent mixture used to provide the solutions described below is a mixture containing 9 parts of toluene per part of acetone. The lacquer is prepared by intimate mixing of the following ingredients in the amounts shown:

|  | Parts |
|---|---|
| 39% solution of 80/20 methyl methacrylate/glycidyl methacrylate copolymer | 37 |
| 39% solution of 70/30 methyl methacrylate/methyl acrylate copolymer | 37 |
| Bis(cyclohexoxycarbonylmethyl)phthalate | 5 |
| Mono-acetyl-ortho phosphate | 1.8 |
| Azelaic acid | 1.6 |
| Carbon black base [1] (20.2% solids) | 58 |
| Methoxyethylacetate ("Cellosolve" acetate) | 30 |
| Methyl ethyl ketone | 120 |

[1] The black pigment mill base used in the above formula is prepared by grinding in a rubber mill a mixture of 5 parts of carbon black pigment, 10 parts of bis(cyclohexoxycarbonylmethyl)phthalate and 7.5 parts of one half second viscosity nitrocellulose and the milled mixture is dissolved in a sufficient amount of ethylacetate to provide the required dilution.

The lacquer of this example contains about 29% solids and is in a form suitable for spray application. It has good storage stability and is especially useful in providing a high gloss, jet black, craze-resistant, durable topcoat on automobile bodies.

The following compounds are given as further examples of esters employed in the compositions of this invention and it will be understood that such compounds can be used in place of the varous compounds specifically shown in the foregoing detailed examples:

Bis(nonoxycarbonylmethyl)phthalate
Bis(dodecoxycarbonylmethyl)phthalate
Bis(tetradecoxycarbonylmethyl)phthalate
Bis(hexadecoxycarbonylmethyl)phthalate
Bis(octadecoxycarbonylmethyl(phthalate
Bis(2-ethylhexoxycarbonylpropyl)phthalate
Bis(cyclopentoxycarbonylmethyl)phthalate
Bis(3-hexoxycarbonylbutyl)phthalate
Bis(3,5-dimethylcyclohexoxycarbonylmethyl)phthalate
Bis(methylcylohexylethoxycarbonylmethyl)phthalate
Bis(4-decylcyclohexoxycarbonylmethyl)phthalate
(Benzyloxycarbonylmethyl) (2-ethylhexoxycarbonylmethyl)phthalate
(Benzyloxycarbonylmethyl) (decoxycarbonylmethyl)phthalate
(Hexoxycarbonylmethyl) (phenylpropoxycarbonylmethyl)phthalate
(Benzyloxycarbonylmethyl) (cyclohexoxycarbonylmethyl)phthalate
(Isopropoxycarbonylmethyl) (lauroxycarbonylmethyl)phthalate Tris(octoxycarbonylmethyl)trimellitate
Tris(cyclohexoxycarbonylmethyl)trimellitate
Tetra(cyclohexoxycarbonylmethyl)pyromellitate
Tris(n-decoxycarbonylmethyl)trimellitate
Tris(2-propylcyclohexoxycarbonylmethyl)trimellitate
Tris(isononoxycarbonylmethyl)trimellitate
Tetra(isooctoxycarbonylmethyl)pyromellitate
Tetra(decoxycarbonylmethyl) pyromellitate
Tetra(tetradecoxycarbonylmethyl)pyromellitate
(Benzyloxycarbonylmethyl)tris(2-ethylhexoxycarbonylmethyl)pyromellitate
Bis(cyclohexoxycarbonylmethyl)bis(hexoxycarbonylmethyl)pyromellitate
Tetra(isodecoxycarbonylmethyl)pyromellitate
Penta(2-ethylhexoxycarbonylmethyl)benzenepentacarboxylate
Penta(hexoxycarbonylmethyl)benzenepentacarboxylate While this invention has been described with respect to certain specific embodiments, it is not so limited and it is to be understood that variations and modifications thereof may be made without departing from the spirit or scope of the invention.

The embodiments of the invention in which an exclusive property or privilege is claimed are defined as follows:

1. A coating composition comprising a polymer of methyl methacrylate selected from the group consisting of homopolymers of methyl methacrylate and copolymers of methyl methacrylate containing at least 75% methyl methacrylate and up to 25% of an ethylenically unsaturated monomer copolymerizable therewith, an organic solvent for said polymer and a compatible amount of a plasticizer of the structure:

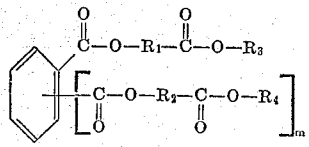

wherein $m$ is an integer of from 1 to 4, $R_1$ and $R_2$ are divalent aliphatic hydrocarbon radicals containing from 1 to 4 carbon atoms, $R_3$ is a radical selected from the group consisting of aliphatic, cycloaliphatic and araliphatic hydrocarbon radicals having up to 18 carbon atoms, and $R_4$ is selected from the group consisting of aliphatic and cycloaliphatic hydrocarbon radicals having up to 18 carbon atoms.

2. A composition of claim 1 wherein the polymer of methyl methacrylate is a homopolymer.

3. A composition of claim 1 wherein the polymer of methyl methacrylate is a copolymer containing about 98% of methyl methacrylate and about 2% methacrylic acid.

4. A coating composition comprising a polymer of methyl methacrylate selected from the group consisting of homopolymers of methyl methacrylate and copolymers of methyl methacrylate containing at least 75% methyl methacrylate and up to 25% of an ethylenically unsaturated monomer copolymerizable therewith, an organic solvent for said polymer and a compatible amount of a plasticizer of the structure:

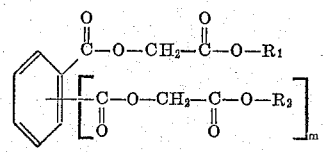

wherein $R_1$ and $R_2$ are alkyl radicals containing from 6 to 18 carbon atoms and $m$ is an integer of from 1 to 3.

5. A composition of claim 4 wherein the polymer of methyl methacrylate is a homopolymer.

6. A composition of claim 5 wherein the proportion of plasticizer employed is within the range of from about 10 to about 50 parts by weight plasticizer per 100 parts by weight of polymer.

7. A composition of claim 6 wherein the plasticizer is bis(2-ethylhexoxycarbonylmethyl)phthalate.

8. A composition of claim 6 wherein the plasticizer is the bis(2-ethylhexoxycarbonylmethyl) ester of an isomeric mixture of phthalic acids.

9. A composition of claim 6 wherein the plasticizer is bis(tridecyloxycarbonylmethyl)phthalate.

10. A coating composition comprising a polymer of methyl methacrylate selected from the group consisting of homopolymers of methyl methacrylate and copolymers of methyl methacrylate containing at least 75% methyl methacrylate and up to 25% of an ethylenically unsaturated monomer copolymerizable therewith, an organic solvent for said polymer and a compatible amount of a plasticizer of the structure:

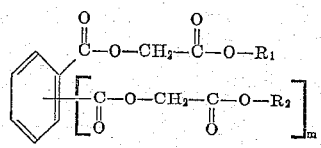

wherein $R_1$ and $R_2$ are cycloalkyl radicals containing from 6 to 18 carbon atoms and $m$ is an integer of from 1 to 3.

11. A composition of claim 10 wherein the polymer of methyl methacrylate is a homopolymer.

12. A composition of claim 10 wherein the polymer of methyl methacrylate is a copolymer containing about 98% methyl methacrylate and about 2% methacrylic acid.

13. A composition of claim 11 wherein the proportion of plasticizer employed is within the range of from about 10 to about 50 parts by weight per 100 parts by weight of polymer.

14. A composition of claim 13 wherein the plasticizer is bis(cyclohexyloxycarbonylmethyl)phthalate.

References Cited in the file of this patent

UNITED STATES PATENTS

| | | |
|---|---|---|
| 2,073,937 | Kyrides | Mar. 16, 1937 |
| 2,260,295 | Carruthers et al. | Oct. 28, 1941 |
| 2,934,510 | Crissey et al. | Apr. 26, 1960 |

FOREIGN PATENTS

| | | |
|---|---|---|
| 559,676 | Canada | July 1, 1958 |

OTHER REFERENCES

Geiges: Abstract of abandoned specification Number 568,076, published in Official Gazette, August 13, 1949, 1 page.

Simonds et al.: "Handbook of Plastics"; 2nd edition; 1949, pages 340, 348, 381, 729 (Sci. Lib. TP 986 A2 S48, Gr. 150), D. Van Nostrand Co., Inc.